Sept. 19, 1967 M. PENBERG 3,342,972
WELDING ELECTRODE ASSEMBLY
Filed Jan. 22, 1964 5 Sheets-Sheet 1
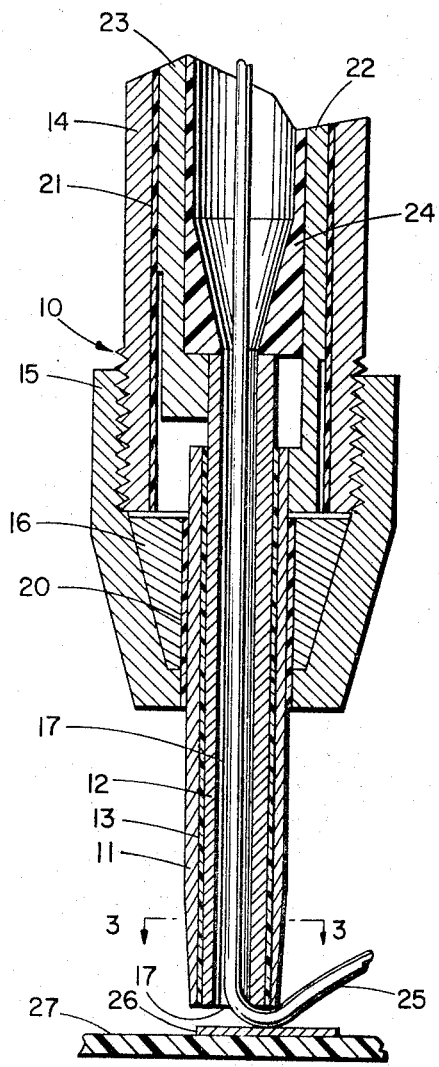
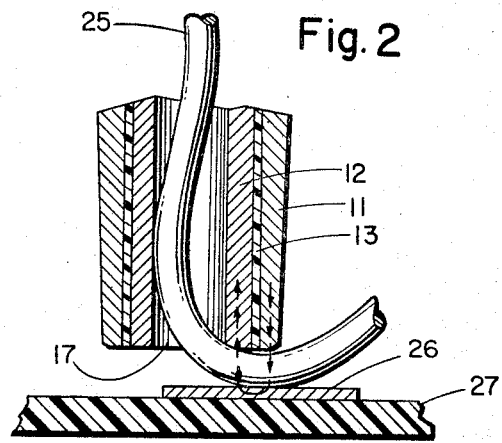
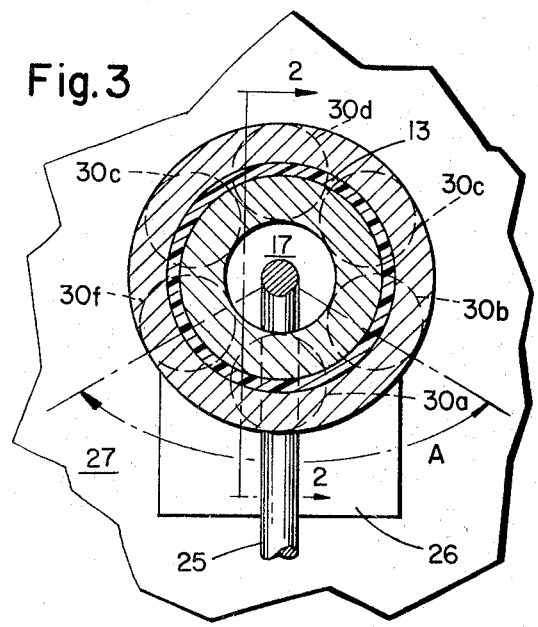
INVENTOR.
MORTIMER PENBERG
BY Edward O. Ansell
John E. Wagner
ATTORNEY

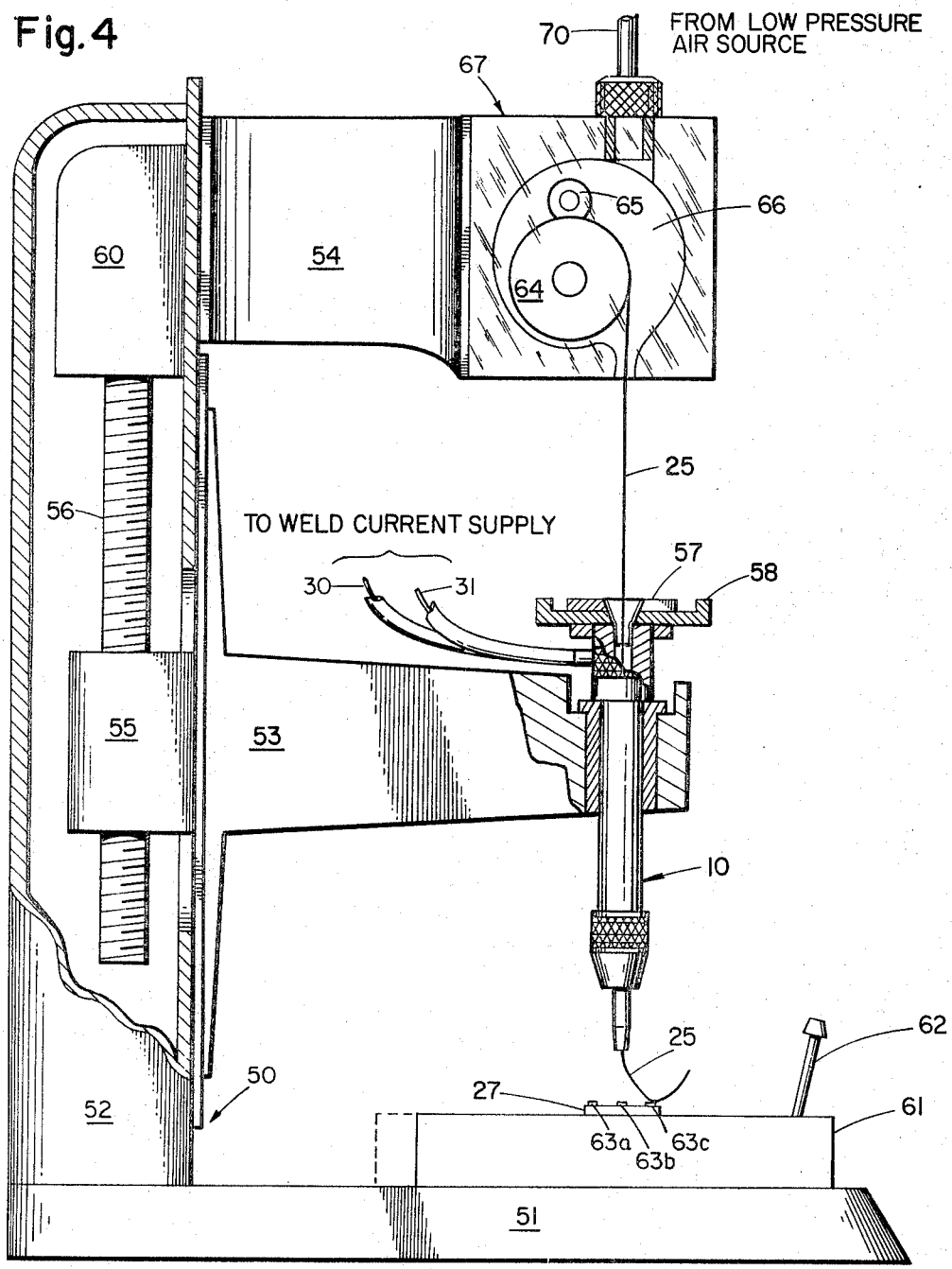

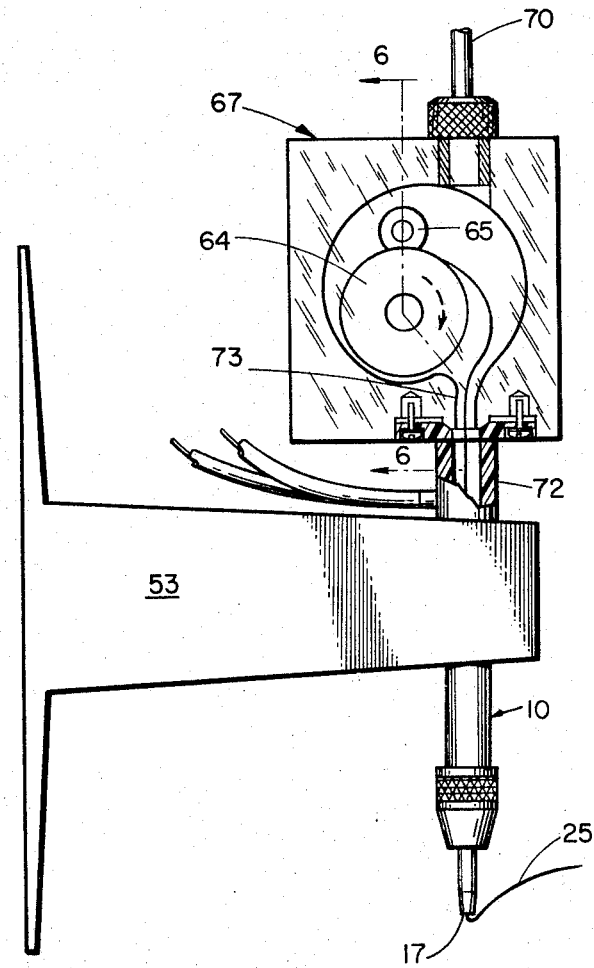

Sept. 19, 1967 M. PENBERG 3,342,972
WELDING ELECTRODE ASSEMBLY
Filed Jan. 22, 1964 5 Sheets-Sheet 4

INVENTOR.
Mortimer Penberg
BY Edward O. Ansell
John E. Wagner
ATTORNEY

Sept. 19, 1967 M. PENBERG 3,342,972
WELDING ELECTRODE ASSEMBLY
Filed Jan. 22, 1964 5 Sheets-Sheet 5

INVENTOR.
Mortimer Penberg
BY Edward O. Ansell
John E. Wagner
ATTORNEY

United States Patent Office 3,342,972
Patented Sept. 19, 1967

3,342,972
WELDING ELECTRODE ASSEMBLY
Mortimer Penberg, Covina, Calif., assignor to Aerojet-General Corporation, Azusa, Calif., a corporation of Ohio
Filed Jan. 22, 1964, Ser. No. 339,505
14 Claims. (Cl. 219—119)

ABSTRACT OF THE DISCLOSURE

This disclosure concerns a welding electrode assembly comprising concentric elongated inner and outer tubular electrodes which are maintained in insulated relation to each other by a tubular dielectric layer interposed therebetween. Welding wire is adapted to be fed through the inner tubular electrode and disposed across the operative end portions of the electrodes in effecting a weld, the welding wire being dispensed from a spool holder provided with some form of tension control for imparting a controlled tension to the welding wire after completion of a weld as additional welding wire is drawn through the inner tubular electrode.

---

This invention relates to precision welding equipment and more particularly to electrode structures therefor.

The welding of lead wires to subminiature or microcircuit electronic assemblies has been successfully accomplished employing the precision welder described in my co-pending patent application Ser. No. 214,051 filed Aug. 1, 1962, now U.S. Patent 3,234,354 issued Feb. 8, 1966. It comprises basically a work support table adjustable horizontally in two directions to position a work piece, a vertical frame and a carriage supporting an electrode assembly. The carriage is movable in a vertical direction to bring the electrode assembly into contact with the selected area of the work piece. The electrode assembly constitutes a pointed pencil-like member including a pair of semi-cyclindrical conductive electrodes separated by a thin dielectric a few one-thousandths of an inch (mils) thick. The welder includes a power supply and timing circuit allowing the passage of a controlled number of current pulses from one electrode, through a localized area of the work piece, and through the second electrode. The minute size of the electrode assembly and the gap between the electrodes allows the reliable welding of one mil (0.001 in.) diameter wires to one mil wide conductive areas on a dielectric substrate on three mil centers.

Employing the precision welder of my previous invention, each lead wire to be welded to a conductive surface is manually positioned over the area to be welded and by positional adjustment of the work table the lead wire and work piece are brought directly under the electrode assembly. The carriage is lowered, the power supply and timing circuit energized and the weld accomplished. It is apparent that the precise positioning of the lead with respect to the vertical axis of the electrode assembly require a high degree of operator skill and at best is time consuming.

I have found that the positional accuracy possible, employing my precision welder, in the securing of lead wires is of particular importance in certain microcircuit applications, but increased speed in the positioning operaton and simplified lead handling can be of real value particularly if the desire is to obtain production line or semiautomated welding of miniature assemblies.

In order to attain this end it is a general object of this invention to provide an improved electrode structure for precision welders.

Another object of the invention is to facilitate the positioning of minute lead wires with respect to a workpiece to be welded.

Still another object is to provide for semi-automatic feeding of lead wires for sequentially welding a number of leads to a workpiece.

One further object is to provide a miniature welding electrode assembly having an elongated or circular welding gap whereby a large number of welding regions are available linearly or peripherally and the life of the electrode is greatly increased.

These objects are all accomplished in accordance with this invention, one embodiment of which comprises a hollow tubular electrode structure including a pair of concentric conductive electrodes separated by a tubular dielectric spacer or dielectric layer deposited on either the outer surface of the inner electrode or the inner surface of the outer electrode. The electrode assembly is of small enough outside diameter to present a needle-like appearance (0.030 in. diameter), but of sufficient size to include a central aperture which will freely pass the lead wire.

A wire spool holder is associated with the electrode carriage with a feed tube communicating with the central aperture in the electrode structure. The wire spool holder includes adjustable tensioning means to provide a controllable tension applied to the lead wire passing through the electrodes.

One feature of this invention resides in the combination of a pair of concentric hollow welding electrodes adapted to produce a local weld on a work piece extending across any region of the end of the electrode.

Another feature relates to a hollow electrode assembly including means for feeding weldable material through the central opening therein.

Still another feature of this invention involves the combination of a hollow welding electrode and controllable tension wire feed means whereby a controlled tension weld strength or pull strength test may be accomplished after completion of a weld by movement of the work piece from its position directly beneath the electrode assembly.

These and other features of this invention may be more clearly understood from the following detailed description and by reference to the drawing in which:

FIG. 1 is an enlarged axial section of an electrode assembly in accordance with this invention;

FIG. 2 is a further enlarged fragmentary section of the tip of the electrode assembly of FIG. 1;

FIG. 3 is an enlarged transverse section of the electrode tip taken along line 3—3 of FIG. 1;

FIG. 4 is a side elevational view of the frame, work table and electrode carriage of a precision welder employing the improved electrode of this invention and one form of wire feed apparatus;

FIG. 5 is a side elevational view of an embodiment of this invention in which the electrode assembly carries the wire feed mechanism;

Figure 6:
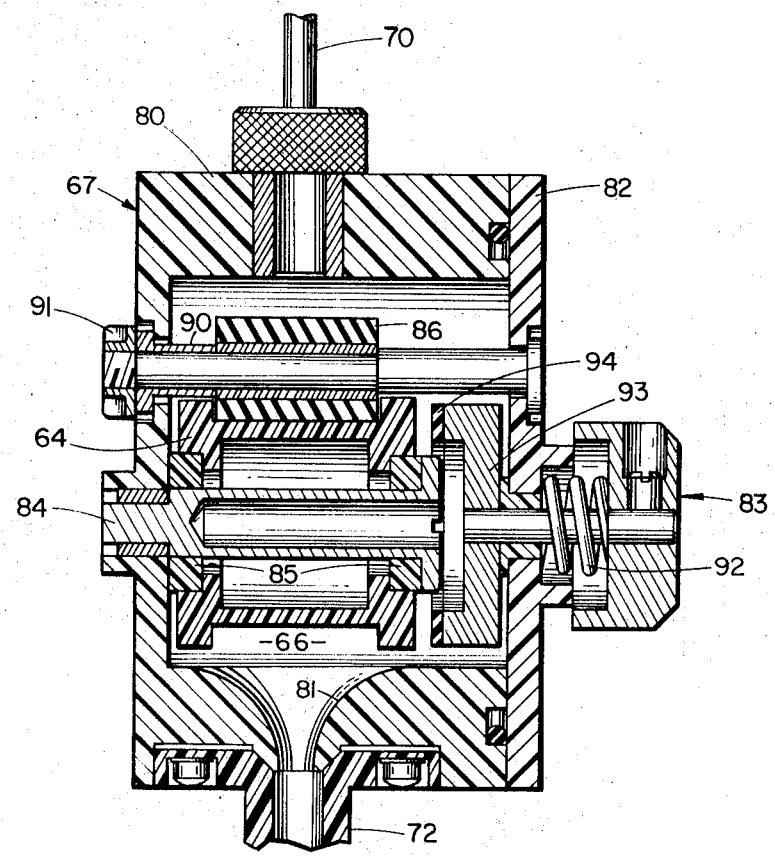
FIG. 6 is a vertical section through the wire feed mechanism along line 6—6 of FIG. 5.

Now referring to FIG. 1 an electrode assembly 10 in accordance with this invention may be seen. It comprises basically a pair of concentric metal tubes, an outer tube 11 and an inner tube 12 separated by a thin dielectric spacer 13. In normal practice the outer tube 11 is fabricated of 0.020 to 0.035 in. diameter tubing of stainless steel, molybdenum, tantalum, tungsten or copper or alloys thereof having a wall thickness in the order of 0.002 in. to 0.009 in. and a length of approximately 1 to 4 in. depending upon the electrode holder design. The inner electrode tube 12 is of similar material to the tube 11 and has an outer diameter of approximately 0.0005 to 0.004 in. less than the inner diameter of the tube 11. Typical dimensions for the tube 12 are inside diameter 0.012 in., outside diameter 0.020 in., and a length of one-quarter to one-half inch greater than the length of tube 11, to facilitate making electrical connection to the inner electrode 10 of the assembly. Between the tubes 11 and 12 in either direct adherent contact or press fit relationship is a layer or a spacer 13 of a dielectric material having a sufficient dielectric strength to prevent breakdown and short-circuiting and of sufficient resistance to welding heat damage to maintain its dielectric properties throughout the normal life of the electrode assembly, to wit several thousand welds. A dielectric such as quartz or alumina ($Al_2O_3$) meets both of the dielectric and thermal properties and, therefore, is preferred. Certain organic polymers such as polytetrafluoroethylene, known by the trade name of "Teflon," are also suitable although their melting points are low compared to the ceramic. A localized decomposition of the dielectric at the tip of the electrode is of no concern provided no conductive path results between the electrodes 11 and 12 as a result of the decomposition.

The electrode tubes 11 and 12 and the dielectric 13 constitute a unitary electrode assembly secured to an electrode holder 14 by a threaded chuck 15 enclosing a tapered collar 16. The holder 14, chuck 15 and collar 16 are electrically insulated from the electrode assembly by a pair of dielectric tubes 20 and 21. Connected to the upper end of the outer electrode 11 is a hollow semi-cylindrical copper bus 22 which is connected to one of two electrical leads 30 and 31 appearing in FIG. 4. A second hollow semi-cylindrical cylinder 23 of copper is secured to the upper end of the electrode 12 which extends beyond the end of the outer electrode 11. The semi-cylindrical members 22 and 23 are of the same diameter and occupy corresponding halves of the tubular opening in the electrode holder 14 while being electrically isolated from each other by longitudinally extending dielectric spacers unshown in the drawing.

Contained within the tubular opening formed by the members 22 and 23 is a dielectric tube 24 having a central opening which tapers to communicate with the central opening 17 in the inner electrode 12. The dielectric tube 24 constitutes a guide tube for the welding wire or ribbon 25 extending downward through the electrode assembly to emerge from the central opening 17 and overlying the terminal area 26 of workpiece 27 to be welded. The weld wire 25 is in intimate contact with the terminal area 26 and with the electrodes 11 and 12 in normal operation supporting the entire weight of the electrode assembly.

The details of the positional relationship of the electrodes 11 and 12, the welding wire 25 and the workpiece 27 may be more clearly seen in FIG. 2 in position for welding the wire 25 to the terminal pad 26 on a dielectric substrate constituting the workpiece. As shown in FIG. 2 the wire 25 curves out of the opening 17 in the natural shape resulting from a slight tension applied as by the operator's hand and in passing out of the opening 17 contacts both tubes 11 and 12. The contact therebetween is actually insured by a biasing force produced by the weight of the electrode assembly plus a preselected weight normally positioned on the electrode holder in the manner described in detail in my aforementioned co-pending patent application, now U.S. Patent 3,234,354, issued Feb. 8, 1966, or as illustrated in FIG. 4 described below. During the welding cycle current flows as indicated in FIG. 2 by the dashed arrows down through the electrode 11 through the proximate regions of the wire 25 and terminal pad 26 and up through the coaxial electrode 12. Welding current of sufficient amplitude and duration is supplied to fuse the wire 25 and terminal pad 26 and produce an effective weld. The welding electrode material chosen in accordance with common welding practice is a material which does not adhere to the particular weld wire used. Therefore, at the completion of the welding step the electrode assembly may be raised without danger of breaking the lead wire, or damaging either the electrode assembly 10 or the work.

A prime advantage of the concentric electrode arrangement of FIG. 1 is illustrated in FIG. 3 in which the assembly, weld wire and workpiece 27 are viewed from directly above. The terminal pad 26 on the dielectric substrate 27 constituting the workpiece is typically of comparable transverse dimensions to the diameter of the electrode assembly. The weld wire 25 emerges from the opening 17 and may be drawn in any direction (360°) with assurance that it will contact both welding electrodes 11 and 12. In the arrangement shown in FIG. 3 the wire 25 is shown as drawn parallel to the length of the terminal pad 26 but in actuality a successful weld will be accomplished with the wire 25 drawn out of the electrode assembly to any angle between the two positions illustrated by the dashed radial lines. In other words, the weld wire cannot be positioned under the weld electrode assembly in a manner in which it will not contact both welding electrodes. The only positioning requirements, therefore, are that the work area to be welded be positioned under the electrode assembly and that the wire be drawn across the workpiece weld area within the limits of the angle A of FIG. 3. This invention eliminates the perennial problem present in semicircular or split double electrodes in which the weld wire must be positioned to extend across a limited width gap and not parallel thereto. One of the advantages of this invention can be obtained in the split electrode when one of the semicircular electrodes includes a longitudinal wire feed opening therethrough. This allows semiautomatic feed of weld wire although it lacks 100% assurance that the weld wire will extend across the welding gap. For this reason, the nested form of electrode assembly is preferred.

Another prime feature of this invention is illustrated in FIG. 3. The area in which the fusing and welding takes place in normal operation is represented by the dashed circle 30a centered about the dielectric gap over the weld wire 25 and terminal pad 26. This weld area is multiplied many times over around the continuous circular welding gap. A number of other "parallel" welding gaps 30b–f are identified by other dashed circles. Practically speaking, over twenty different welding positions are available on an electrode before redressing. This means that a single electrode assembly which in normal use is subject to a degree of erosion may be used for as much as 20 to 30 times the number of welds than the simple split electrode configuration of my previous invention. It is possible merely by rotating the electrode to bring a new area into use. Even this capability of facile electrode weld surface renewal is not required in normal use since the point at which the weld takes place is determined largely by the operator in the direction in which he draws the weld wire from the opening 17. In normal operation the position of the wire will be slightly different or perhaps at remote positions for sequential welds resulting in usage of different weld areas. In fact, in sequential welding operations as described below the area of the electrodes used is determined by the direction of movement of the work piece between welds, a function of the circuit configuration, and in most instances results in the use of different weld areas for each weld.

The means for producing sequential welds without the necessity of handling the weld wire and providing a pull test of each weld may be seen in FIG. 4 showing the mechanical portions for a precision welder of the type disclosed in my aforementioned copending application, now U.S. Patent 3,234,354 issued Feb. 8, 1966, and incorporating the electrode structure of this invention.

The apparatus includes basically a frame 50 including a table portion 51 and a vertical support and housing 52 from which extends the electrode carriage 53 and a weld wire spool support 54. The spool support in this arrangement is rigidly secured to the frame 50 while the carriage 53 is guided by the side walls of a slotted opening in the vertical support 52. The carriage 53 is transported by a traveling nut 55 engaging a lead screw 56 which is driven by a motor 60.

The table 51 supports a work holder 61 for positioning a workpiece for welding under the control of a handle 62. In this case the work piece comprises a microcircuit assembly approximately 40 mils square in dimension and having three terminal pads 63a, b and c to which 2 mil terminal wires are to be welded. The wire 25 is supplied from a spool 64 journaled within the support 54 and restrained from free rotation by an adjustable follower 65 bearing against the wire on spool 64 and thereby allowing tension to be applied to the wire 25.

In the position shown the wire has been fed out of the spool chamber 66 in a wire feed assembly 67 either manually or by air pressure applied to an inlet 70 and through the hollow electrode structure 10 to the work area. One weld has been completed as indicated by the lead wire bonded to the terminal pad 63c. This weld was accomplished with the support table in the position indicated by the dashed lines, prior to movement by the handle 62 to the position shown in the drawing. The wire is under light tension between the terminal pad 63c and electrode assembly 10 as determined by the force applied by the roller 65 to the supply spool 64. The tension applied to the wire 25 after moving produces a weld strength test immediately after completion so that a defective weld is discovered immediately and may be corrected before any further assembly makes correction difficult or impossible. The pull on the weld wire after welding upon the raising of the electrode carriage 53 also automatically feeds a length of terminal wire 25 without the necessity of the operator touching or drawing the wire off the spool 64.

As shown in FIG. 4 the workpiece has been moved after the first weld to a position in which the terminal 63b is directly under the electrode assembly 10 and ready for the welding of the wire 25 to that terminal pad. In the normal sequence of operations the "weld" control button of the apparatus unshown in the drawing is actuated, the carriage automatically lowered until the electrode assembly is supported on the terminal pad 63b and wire 25, the weld current is initiated, terminated, and the carriage 53 automatically raised. Movement of the work support 61 will again apply a weld strength test to the terminal pad-wire junction and draw out additional wire for the next weld.

The sequence of welds on a single assembly may be programmed to provide sufficient free lengths between sequential welds so that after completion of the welding of all terminals the lengths of welding wire extending between terminal pads may be severed as by a precision hydrogen torch or by cutting or may be left as an electrical jumper if such is required.

In FIG. 5 a modification of the apparatus of FIG. 4 may be seen in which the wire feed assembly is mounted directly upon the carriage 53 and electrode assembly 10 by a support tube 72 with the feed orifice 73 of the wire spool assembly communicating directly with the central opening in dielectric tube 24 of FIG. 1. This embodiment has the advantage of rigidly securing all of the wire handling portions of the apparatus into one assembly with no relative movement between the spool assembly and electrode proper. When handling extremely fine wire this arrangement eliminates any handling of the lead wire 25 beyond drawing the wire to the side as it initially emerges from the electrode opening 17. Feeding of the wire 25 is accomplished by manually turning the wire loaded spool 64 in the direction of the dashed arrow while applying air pressure to the tube 70 to blow the wire end down through the tube 72 and out the electrode orifice 17. One disadvantage of the arrangement of FIG. 5 as compared with FIG. 4 is that the wire feed assembly becomes a part of the weld pressure load and therefore affects the minimum weld pressure which may be applied to the welding electrode assembly 10. Both the arrangements of FIGS. 4 and 5 provide for effective wire feeding.

The details of the wire feed assembly 67 are more clearly shown in FIG. 6, a sectional view along the line 6—6 of FIG. 5.

The assembly 67 comprises basically a transparent housing 80 defining a chamber 66 having a wire throat 81 communicating with the central opening in tube 72. The housing is sealed by a closure 82 mounting a spring loaded manual knob and clutch assembly 83.

A shaft 84 secured to one wall of housing 80 supports the spool 64 on a pair of bearings 85 preferably of the plastic polymer polytetrafluoroethylene, known by the commercial trade name of Teflon. The shaft 84 and bearings 85 journal the spool 64 for free rotation, presenting the winding surface of the spool to the outlet throat 81 of the assembly. Engaging the wire carrying portion of the spool 64 is a pressure roller 86 carried on a shaft 90 which is manually adjustable toward and away from the spool 64 to apply a controllable pressure against the spool 64 and thereby apply a tension producing restraining force to the wire drawn from the spool 64 in the welding operation. The position of shaft 90 and the pressure applied to the roller 64 are varied by releasing the locking screw 91, moving the pressure roller to the desired engagement with spool 64 and retightening the locking screw 91. Since it is customary to use very fine wire, such as 1–2 mils diameter, a very great length of wire can be stored on spool 64 in a single layer, thereby insuring a uniform pressure on each of the turns. It is possible to have multilayered windings on the spool but for most applications this is not necessary because a single micro-circuit board normally requires only an inch or two, at most, of leads and a single layer of wire on the spool 64 will carry many feet of the fine lead wire.

The manual clutch 83 secured to the wall 82 of the wire feed assembly is spring biased outward by internal spring 92 thereby maintaining a cup-shaped braking member 93 having an annular friction surface 94 away from the spool 64. Whenever the knob 83 is pressed inwardly, the friction surface 94 engages the end of spool 64 and rotation of the knob 83 then allows the manual feeding of wire from the spool 64 by overcoming the frictional engagement of the pressure roller 86. The manual knob 83 is normally used only to start the feed of wire from the spool 64 through the outlet 81 either with or without the assistance of low pressure air applied to the inlet 70. All air pressure is turned off before attempting the first weld. After the first weld, wire feed occurs automatically on movement of the workpiece as described in connection with FIG. 4.

Figure 7:
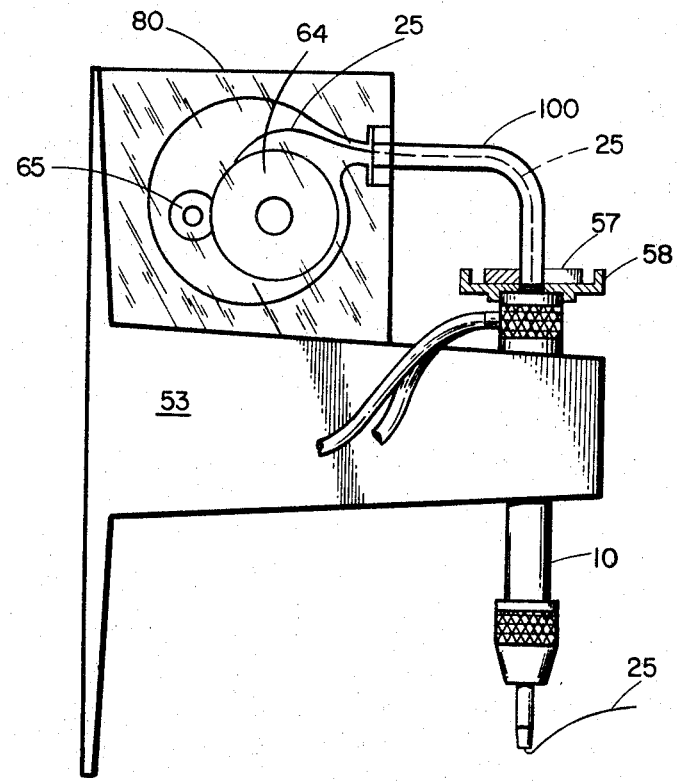
FIG. 7 is an elevational view of another embodiment of this invention in which the wire feed assembly is carried by the electrode carriage.

The wire storage housing need not be positioned directly over the electrode assembly as shown in FIGS. 4 and 5, but as demonstrated in FIG. 7 may be mounted at the rear of the carriage 53 in a manner so as to minimize obstruction of the region above or around the electrode assembly. In this case the wire 25 should be fed from the supply spool 64 and housing 80 via the 90° curved tube 100 to the electrode assembly. In such an arrangement it is desirable that the tube 100 telescope with the electrode assembly so that the wire feed assembly does not affect the weld pressure which may be applied. As in the case of the embodiment of FIG. 4 the weld pressure may be controlled by the addition of weights 57 carried by pan 58 mounted on the electrode assembly 10.

It may be seen from the embodiments of this invention that the heart of the invention resides in the presence of the hollow electrode assembly through which lead wires may be fed and deployed outward across the welding gap between the inner and outer electrodes, thereby providing automatic positioning of the weld wire with respect to the electrode assembly. Where the electrodes are coaxial, approximately 20 to 30 times the linear area of electrode surface is available for use as compared with conventional split electrodes. The concentric hollow electrode assembly in combination with wire feed positioned to introduce weld wire into the hollow central electrode affords a rapid, semi-automatic and ultimately automatic precision welding of micro-miniature electronic assemblies. The combination of the hollow electrode assembly and a controlled tension feed assembly assures that both automatic feeding of weld wire occurs upon movement of the work piece between welds, and that a controlled pull test is applied to each completed weld.

The embodiments shown and described herein are merely illustrative of my invention and its scope is not limited thereto but rather is defined by the appended claims and equivalents thereof.

What is claimed is:

1. In a welding electrode assembly,
a pair of elongated conductive electrodes arranged in parallel relationship with respect to each other and having their operative end portions disposed in substantially flush relationship,
means fixedly securing said electrodes in spaced insulated relationship with respect to each other so as to define a welding gap between said electrodes separating the operative end portions thereof, and
one of said electrodes having an opening extending longitudinally therethrough from the end thereof opposite to said operative end portion and communicating with the operative end portion of said electrode in the region of the welding gap,
said opening being adapted to receive an elongated length of welding wire at the end thereof opposite from said operative end portion, whereby welding wire may be fed through the opening in said one electrode and disposed across the welding gap in contact with the operative end portions of said electrodes.

2. In a welding electrode assembly,
a pair of elongated conductive tubular electrodes arranged in concentric relationship with respect to each other and having their operative end portions disposed in substantially flush relationship,
means fixedly securing said electrodes in radially spaced insulated relationship with respect to each other so as to define an annular welding gap between said electrodes separating the operative end portions thereof, and
the internal elongated opening provided by the inner tubular electrode of said pair of elongated concentric tubular electrodes being adapted to receive an elongated length of welding wire at the end thereof opposite from said operative end portion, whereby welding wire may be fed through said inner tubular electrode and disposed across the annular welding gap in contact with the operative end portions of said electrodes.

3. A welding electrode assembly comprising:
a pair of elongated conductive electrodes arranged in parallel relationship with respect to each other and having their operative end portions disposed in substantially flush relationship,
means fixedly securing said electrodes in spaced insulated relationship with respect to each other so as to define a welding gap between said electrodes separating the operative end portions thereof,
one of said electrodes having an opening extending longitudinally therethrough from the end thereof opposite to said operative end portion and communicating with the operative end portion of said electrode in the region of the welding gap,
a supply of welding wire, and
means communicating between said welding wire supply and the longitudinally extending opening in said one electrode at the end thereof opposite from said operative end portion, whereby welding wire from said welding wire supply may be fed through the longitudinally extending opening in said one electrode and disposed across the welding gap in contact with the operative end portions of said electrodes.

4. A welding electrode assembly comprising:
a pair of elongated conductive tubular electrodes arranged in concentric relationship with respect to each other and having their operative end portions disposed in substantially flush relationship,
means fixedly securing said electrodes in radially spaced insulated relationship with respect to each other so as to define an annular welding gap between said electrodes separating the operative end portions thereof,
a supply of welding wire, and
means communicating between said welding wire supply and the internal elongated opening provided by the inner tubular electrode of said pair of elongated concentric tubular electrodes at the end thereof opposite from said operative end portion, whereby welding wire from said welding wire supply may be fed through said inner tubular electrode and disposed across the annular welding gap in contact with the operative end portions of said electrodes.

5. A welding electrode assembly comprising:
a pair of elongated conductive tubular electrodes arranged in fixed concentric relationship with respect to each other and having their operative end portions disposed in substantially flush relationship,
a relatively thin layer of insulating material disposed between said pair of electrodes and in respective engagement therewith to maintain said electrodes in radially spaced insulated relationship with respect to each other,
said layer of insulating material defining an annular welding gap between said electrodes separating the operative end portions thereof,
a supply of welding wire, and
means communicating between said welding wire supply and the internal elongated opening provided by the inner tubular electrode of said pair of elongated concentric tubular electrodes at the end thereof opposite from said operative end portion, whereby welding wire from said welding wire supply may be fed through said inner tubular electrode and disposed across the annular welding gap in contact with the operative end portions of said electrodes.

6. In a welding apparatus,
a frame comprising
a support member, and
a carriage member extending laterally from said support member and mounted thereon for movement toward and away from a workpiece to be welded;
an electrode assembly carried by said carriage member, said electrode assembly comprising
a pair of elongated conductive tubular electrodes arranged in concentric relationship with respect to each other and having their operative end portions disposed in substantially flush relationship, the operative end portions of said electrodes being disposed outwardly of said carriage member and being adapted to be located in juxtaposition to the workpiece to be welded, and
means fixedly securing said electrodes in radially spaced insulated relationship with respect to each other so as to define an annular welding gap between said electrodes separating the operative end portions thereof;
a supply of welding wire mounted on one of said frame and said electrode assembly, and
means communicating between said welding wire supply and the internal elongated opening provided by the inner tubular electrode of said pair of elongated concentric tubular electrodes at the end thereof opposite from said operative end portion, whereby welding wire from said welding wire supply may be fed through said inner tubular electrode and disposed across the annular welding gap in contact with the operative end portions of said electrodes.

7. In a welding apparatus,
a frame comprising
   a support member, and
   a carriage member extending laterally from said support member and mounted thereon for movement toward and away from a workpiece to be welded;
an electrode assembly extending transversely with respect to said carriage member so as to be disposed in generally opposed relation to the workpiece to be welded, said electrode assembly comprising
   a pair of elongated conductive tubular electrodes arranged in concentric relationship with respect to each other and having their operative end portions disposed in substantially flush relationship, the operative end portions of said electrodes being disposed outwardly of said carriage member and being adapted to be located in juxtaposition to the workpiece to be welded, and
   means fixedly securing said electrodes in radially spaced insulated relationship with respect to each other so as to define an annular welding gap between said electrodes separating the operative end portions thereof;
a supply of welding wire mounted on one of said frame and said electrode assembly,
means mounting said electrode assembly on said carriage member for freely slidable movement with respect thereto such that the electrode assembly is fixed with respect to said carriage member until movement of said carriage member in a direction toward the workpiece causes further movement of the electrode assembly in the same direction to be opposed by the workpiece with said carriage member freely sliding along the electrode assembly upon continued movement of said carriage member in the same direction so that the force imposed by the electrode assembly on the workpiece is determined solely by the weight of the electrode assembly, and
means communicating between said welding wire supply and the internal elongated opening provided by the inner tubular electrode of said pair of elongated concentric tubular electrodes at the end thereof opposite from said operative end portion, whereby welding wire from said welding wire supply may be fed through said inner tubular electrode and disposed across the annular welding gap in contact with the operative end portions of said electrodes.

8. A welding apparatus as defined in claim 7, wherein said welding wire supply is mounted on said frame.

9. A welding apparatus as defined in claim 8, wherein said frame further includes a support arm rigidly secured to said support member and extending laterally therefrom,
said support arm being disposed above said carriage member and in vertical alignment therewith, and
said welding wire supply being mounted on said support arm of said frame.

10. A welding apparatus as defined in claim 8, wherein said welding wire supply is mounted on said carriage member of said frame and is disposed to one side of said electrode assembly out of vertical alignment therewith, and
said means communicating between said welding wire supply and the internal elongated opening provided by the inner tubular electrode including a curved tube extending between said welding wire supply and said electrode assembly and through which welding wire from said welding wire supply is guided.

11. A welding apparatus as defined in claim 7, wherein said welding wire supply is mounted on said electrode assembly so as to be movable therewith as a component thereof.

12. A welding apparatus as defined in claim 7, further including
a rotatable spool on which the welding wire supply is wound,
means adjacent to said spool for restraining the withdrawal of welding wire from the spool, and
means to selectively impart rotation to said spool overcoming said restraining means for paying out welding wire from said spool to feed welding wire to the internal elongated opening in said inner tubular electrode through said communicating means.

13. A welding apparatus as defined in claim 12, wherein said restraining means comprises a roller adjacent to said spool and engaging the welding wire wound thereon, and
means for adjusting the position of said roller with respect to said spool to vary the pressure of engagement between said roller and the welding wire wound on said spool.

14. A welding apparatus as defined in claim 13, further including
a housing in which said spool and said roller are mounted, and
said means for selectively imparting rotation to said spool comprising
   a clutch plate disposed within said housing and in alignment with one end of said spool,
   an operating knob disposed outside of said housing,
   a shaft extending through a wall of said housing and having said clutch plate and said operating knob fixedly secured to its opposite ends, and
   biasing means disposed on the outside of said housing and seated between said operating knob and the wall of said housing for normally holding said clutch plate out of engagement with said one end of said spool, whereby said operating knob may be manually urged toward the wall of said housing against the effect of said biasing means to move said clutch plate into engagement with said one end of said spool such that subsequent rotation of said operating knob imparts rotation to said spool while said clutch plate is in engagement therewith.

References Cited

UNITED STATES PATENTS

| | | | |
|---|---|---|---|
| 1,995,494 | 3/1935 | Bardet et al. | 219—85 |
| 2,379,135 | 6/1945 | Ekstedt et al. | 219—56 X |
| 2,689,901 | 9/1954 | Obolensky | 219—234 X |
| 3,036,198 | 5/1962 | Grimland et al. | 219—78 |

RICHARD M. WOOD, *Primary Examiner.*

R. F. STAUBLY, *Assistant Examiner.*